United States Patent
Sun et al.

(10) Patent No.: US 8,477,703 B2
(45) Date of Patent: Jul. 2, 2013

(54) CHANNEL UTILIZATION IMPROVEMENT IN COEXISTING WIRELESS NETWORKS

(75) Inventors: Yanjun Sun, Richardson, TX (US);
Ariton E. Xhafa, Plano, TX (US);
Xiaolin Lu, Plano, TX (US); Assaf Sella, Rishpon (IL)

(73) Assignee: Texas Instruments Incorporated, Dallas, TX (US)

( * ) Notice: Subject to any disclaimer, the term of this patent is extended or adjusted under 35 U.S.C. 154(b) by 349 days.

(21) Appl. No.: 12/822,543

(22) Filed: Jun. 24, 2010

(65) Prior Publication Data

US 2010/0329202 A1 Dec. 30, 2010

Related U.S. Application Data

(60) Provisional application No. 61/219,902, filed on Jun. 24, 2009, provisional application No. 61/242,026, filed on Sep. 14, 2009.

(51) Int. Cl.
*H04Q 7/00* (2006.01)

(52) U.S. Cl.
USPC .......................................... 370/329; 455/436

(58) Field of Classification Search
None
See application file for complete search history.

(56) References Cited

U.S. PATENT DOCUMENTS

| | | | |
|---|---|---|---|
| 6,236,860 B1 * | 5/2001 | Hagting et al. | 455/436 |
| 7,146,133 B2 | 12/2006 | Bahl et al. | |
| 7,406,296 B2 | 7/2008 | Haartsen | |
| 7,945,206 B2 * | 5/2011 | Wilhelmsson et al. | 455/12.1 |
| 8,160,001 B2 * | 4/2012 | Bitran | 370/328 |
| 2004/0259589 A1 | 12/2004 | Bahl et al. | |
| 2005/0058151 A1 | 3/2005 | Yeh | |
| 2005/0059347 A1 | 3/2005 | Haartsen | |
| 2005/0152291 A1 | 7/2005 | Al-Harthi | |
| 2005/0239497 A1 | 10/2005 | Bahl et al. | |
| 2006/0020446 A1 | 1/2006 | Hamby et al. | |
| 2006/0030265 A1 | 2/2006 | Desai et al. | |
| 2006/0030266 A1 | 2/2006 | Desai et al. | |
| 2006/0084383 A1 | 4/2006 | Ibrahim et al. | |
| 2006/0274704 A1 | 12/2006 | Desai et al. | |
| 2007/0060055 A1 | 3/2007 | Desai et al. | |
| 2007/0183383 A1 * | 8/2007 | Bitran et al. | 370/338 |

(Continued)

FOREIGN PATENT DOCUMENTS

WO 2005020518 A1 3/2005

OTHER PUBLICATIONS

Wei-Shin Wang,Bluetooth a new era of connectivity,Sep. 2002,IEEE microwqave magazine.*

*Primary Examiner* — Yemane Mesfin
*Assistant Examiner* — Wanda Z Russell
(74) *Attorney, Agent, or Firm* — Steven A. Shaw; W. James Brady; Frederick J. Telecky, Jr.

(57) ABSTRACT

A wireless device comprises a first wireless transceiver configured for communication via a first wireless network, a second wireless transceiver configured for communication via a second wireless network; and a scheduler that controls which of the first and second transceivers is granted access to a wireless medium at a given time. When the first wireless transceiver has been granted access to the wireless medium by the scheduler and the first wireless transceiver receives a packet via the first wireless network, the scheduler temporarily grants the second wireless transceiver access to the wireless medium based on the packet indicating that first wireless transceiver is not to use the wireless medium for a period of time.

15 Claims, 3 Drawing Sheets

U.S. PATENT DOCUMENTS

| | | |
|---|---|---|
| 2007/0223430 A1 | 9/2007 | Desai et al. |
| 2007/0224936 A1 | 9/2007 | Desai et al. |
| 2008/0123610 A1 | 5/2008 | Desai et al. |
| 2008/0144493 A1 | 6/2008 | Yeh |
| 2008/0192806 A1 | 8/2008 | Wyper et al. |
| 2008/0207126 A1 | 8/2008 | Grushkevich et al. |
| 2009/0197652 A1* | 8/2009 | Lundstrom et al. ........... 455/574 |
| 2009/0268708 A1* | 10/2009 | Lambrecht ................... 370/347 |

* cited by examiner

CHANNEL UTILIZATION IMPROVEMENT IN COEXISTING WIRELESS NETWORKS

CROSS-REFERENCE TO RELATED APPLICATION

The present application claims priority to U.S. Provisional Patent Application No. 61/219,902, filed on Jun. 24, 2009 entitled "Method to Improve Channel Utilization in Coexisting Wireless Networks" and U.S. Provisional Patent Application No. 61/242,026, filed on Sep. 14, 2009 entitled "Method to Improve Channel Utilization in Coexisting Wireless Networks"; both of which are hereby incorporated herein by reference.

BACKGROUND

As wireless technologies proliferate, mobile wireless devices incorporate a multiplicity of different wireless standards. For example, a cellular telephone can accommodate a cellular network (e.g., Universal Mobile Telecommunications System ("UMTS")), a wireless local area network ("WLAN"), such as IEEE 802.11, and a wireless personal area network ("WPAN") (e.g., Bluetooth). Including WPAN access makes utilization of a wireless device more convenient by allowing use of wireless headsets and other short-range wireless appliances.

Some of the various wireless standards adopted for use in mobile devices employ adjacent and/or overlapping portions of the wireless spectrum. For example, both Bluetooth and IEEE 802.11b/g/n occupy the 2.45 GHz band. Such close proximity in the wireless spectrum unfortunately can lead to interference problems.

SUMMARY

The problems noted above are solved at least in large part by, for example, a wireless device that comprises a first wireless transceiver configured for communication via a first wireless network, a second wireless transceiver configured for communication via a second wireless network; and a scheduler that controls which of the first and second transceivers is granted access to a wireless medium at a given time. When the first wireless transceiver has been granted access to the wireless medium by the scheduler and the first wireless transceiver receives a packet via the first wireless network, the scheduler temporarily grants the second wireless transceiver access to the wireless medium based on the packet indicating that first wireless transceiver is not to use the wireless medium for a period of time. Further, in some embodiments no other device in the first wireless network is informed that the first wireless transceiver no longer is granted access to the wireless medium.

In accordance with other embodiments, a method comprising granting a first wireless transceiver access to a wireless medium to communicate with a first wireless network and receiving a packet via the first wireless network. Based on the packet indicating that first wireless transceiver is not to use the wireless medium for a period of time, the method further comprises granting temporary access by a second wireless transceiver to the wireless medium to communicate with a second wireless network. Further still in some embodiments the method comprises not informing any devices on the first wireless network that the first wireless transceiver no longer is granted access to the wireless medium.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical, wireless or optical connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
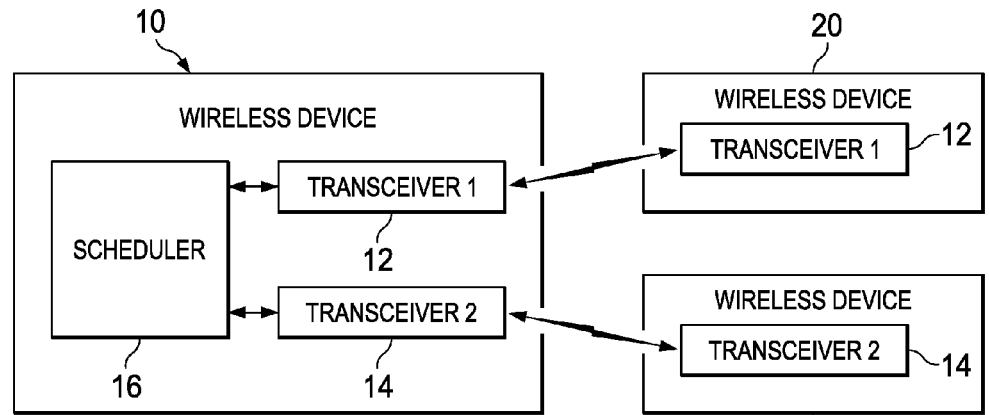
FIG. 1 shows a wireless system including a wireless device with multiple wireless transceivers.

FIG. 1 shows a system in accordance with a preferred embodiment of the invention. As shown, the system includes three wireless devices 10, 20 and 22, although in general any number of wireless devices can be included. Wireless device 10 comprises a plurality of wireless transceivers 12 and 14 coupled to a scheduler 16. Two wireless transceivers 12 and 14 are shown in FIG. 1 as included in wireless device 10, but in other embodiments, more than two wireless transceivers are included.

The two wireless transceivers 12 and 14 shown in FIG. 1 are of different types and thus are designated as Transceiver 1 and Transceiver 2. That the two transceivers are of different types means that one transceiver supports a wireless protocol that differs from the wireless protocol supported by the other transceiver. Each wireless transceiver supports a protocol such as a wireless local area network (WLAN) protocol (e.g., one of the IEEE 802.11 family of WI-FI protocols), a personal area network (PAN) protocol such as Bluetooth, or a ZigBee radio. Thus, one transceiver 12, 14 may be configured, for example, as a Bluetooth transceiver for communicating on a Bluetooth wireless network, while the other transceiver 12, 14 may be configured as a WLAN transceiver for communicating on a WLAN.

Wireless device 20 also includes a wireless transceiver 12 (Transceiver 1). Transceiver 1 of wireless device 20 is configured to wirelessly send packets to and receive packets from Transceiver 1 of wireless device 10. Similarly, wireless device 22 includes a wireless transceiver 14 (Transceiver 2). Transceiver 2 of wireless device 22 is configured to wirelessly send packets to and receive packets from Transceiver 2 of wireless device 10.

To avoid the interference problem noted above, the scheduler 16 sometimes grants access to the wireless medium to one of the transceivers 12, 14 at a time, thereby precluding both transceivers from attempting to communicate simultaneously on the wireless medium. For the sake of simplicity, it is assumed that transceivers 12 and 14 cannot access the medium concurrently, but the principles discussed herein may apply even when only some current medium access is not allowed. Thus, scheduler 16 grants access to Transceiver 1 in the wireless device 10 to communicate over the wireless medium with corresponding Transceiver 1 of wireless device 20. While those communications are occurring, scheduler 16 does not grant access to the wireless medium by Transceiver 2 and thus Transceiver 2 is precluded from communicating over the wireless medium with Transceiver 2 of wireless device 22.

At other points in time, scheduler 16 instead grants access to Transceiver 2 in the wireless device 10 to communicate over the wireless medium with corresponding Transceiver 2 of wireless device 22. While those communications are occurring, scheduler 16 does not grant access to the wireless medium by Transceiver 1 and thus Transceiver 1 is precluded from communicating over the wireless medium with Transceiver 1 of wireless device 20.

Figure 2A:
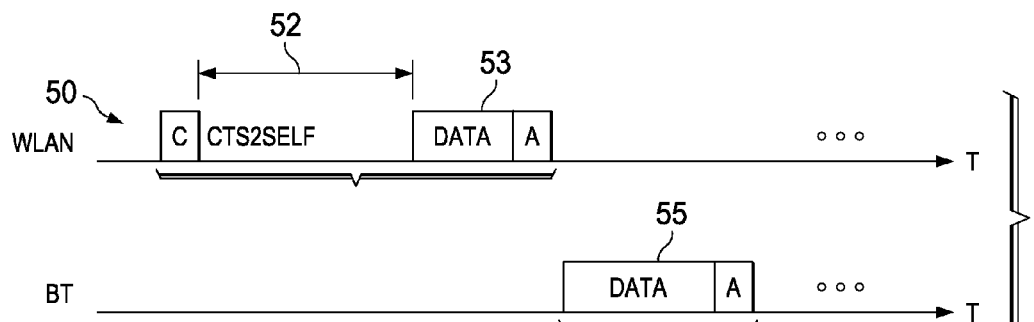
FIG. 2A illustrates an inefficient use of the wireless medium among multiple wireless transceivers.

FIG. 2A shows an example in which one transceiver 12, 14 is configured as a WLAN transceiver and the other transceiver 12, 14 is configured as a Bluetooth transceiver. FIG. 2A illustrates an inefficient use of the wireless medium. As shown, the WLAN transceiver initially has been granted access to the wireless medium for sending and receiving data packets over the WLAN. However at 50, the WLAN transceiver receives a Clear To Send To Self (CTS2Self) packet in accordance with the IEEE 802.11 standard. A CTS2Self packet contains a time duration field that each receiving WLAN node uses to update is network allocation vector (NAV). Any WLAN node that receives a CTS2Self packet will inhibit transmissions in accordance with their newly updated NAVs except for the destination node of the packet. Thus, now transmissions will occur on the WLAN for the duration of the time duration encoded in the CTS2Self packet. In FIG. 2A, that time period is represented as 52. Upon expiration of time period 52, data packets (e.g., data packet 53) can be transmitted over the WLAN as shown followed by the Bluetooth transceiver being granted access to the wireless medium for transmission/reception of data packet 55. During time period 52, no WLAN packets are permitted. Further, because the WLAN transceiver has been granted access to the wireless medium and not the Bluetooth transceiver, the wireless medium is not used at all for any data packets during time period 52, hence the inefficiency noted above.

Figure 2B:
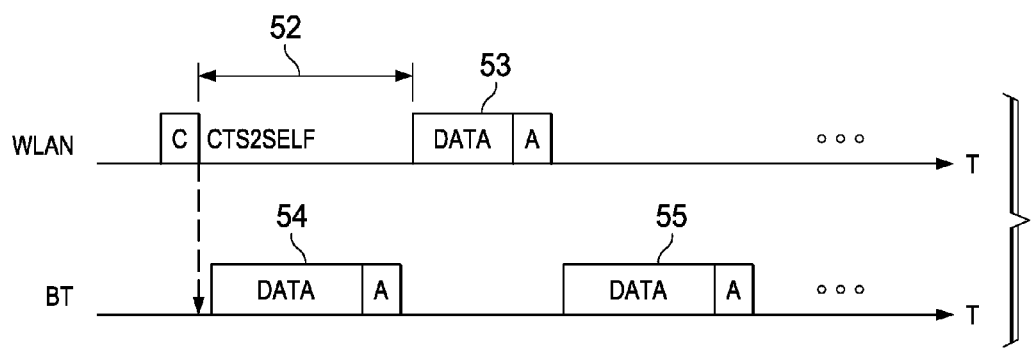
FIG. 2B illustrates an efficient use of the wireless medium among multiple wireless transceivers in accordance with a preferred embodiment of the invention.

In accordance with the preferred embodiments of the invention, FIG. 2B shows a more efficient use of the wireless medium. Because, the CTS2Self packet results in the WLAN not being usable during time period 52, the WLAN transceiver 12, 14 of wireless device 10 alerts the scheduler 16 as to this situation. The scheduler 16 then temporarily grants access to the Bluetooth transceiver 12, 14 to communicate on the wireless medium during time period 52 as illustrated by data packet 54. At the end of the time period 52, the scheduler 16 may automatically grant access to the wireless medium back to the WLAN transceiver.

In other embodiments, a RTS control frame or a CTS control frame may be used to trigger the temporary switchover to the Bluetooth transceiver.

The wireless device 10 may also receive a WLAN "TXOP" packet in which the receiver address indicates that another pair of devices in the WLAN are exchanging packets over a known time duration (e.g., 12 milliseconds). The amount of time is encoded in the duration filed of the packet and is used, in accordance with preferred embodiments, to cause the scheduler 16 to temporarily grant the Bluetooth transceiver 12, 14 access to the wireless medium during that time period.

In some embodiments, when the scheduler 16 temporarily grants the Bluetooth transceiver 12, 14 access to the wireless medium during time period 52, no other wireless device in the WLAN is informed that the WLAN transceiver no longer is granted access to the wireless medium.

In some embodiments, the WLAN transceiver 12, 14 extracts the time period from the CTS2Self packet and sends a message to the scheduler 16 authorizing the scheduler to grant, if desired, wireless medium access to another wireless transceiver (e.g., the Bluetooth transceiver). In yet other embodiments, the scheduler 16 receives a copy of the CTS2Self packet and determines for itself that the Bluetooth transceiver can be granted temporary access to the wireless medium.

Figure 3A:
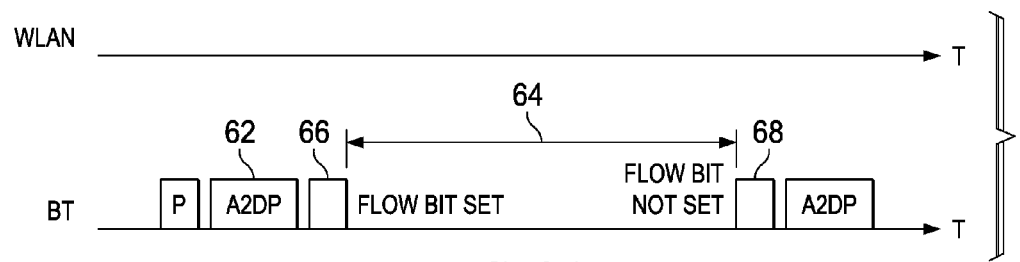
FIG. 3A illustrates yet another inefficient use of the wireless medium among multiple wireless transceivers.

FIG. 3A illustrates another inefficient use of the wireless medium. In the example of FIG. 3A, the Bluetooth transceiver initially is granted access to the wireless medium for transmission of data packet 62. In accordance with the Bluetooth standard, a packet includes a bit field designated as the FLOW bit. The FLOW bit may be set or not in that field. In some embodiments, setting the FLOW bit comprises forcing the bit to a logical 0, while in other embodiments, setting the FLOW bit may comprise forcing the bit to a logical 1. The FLOW bit is used by a recipient of Bluetooth data traffic that stores the incoming Bluetooth data in a receive buffer. If the buffer is nearing or has reached a full condition, the recipient of the Bluetooth data sends a packet to the sender of the Bluetooth data (e.g., wireless device 10 in FIG. 1) with the FLOW bit set. Upon receiving a packet with a set FLOW bit, the sender temporarily ceases sending Bluetooth data packets. The time period 64 during which no Bluetooth data packets are sent begins with the packet 66 in which the FLOW bit is set and ends with a packet 68 in which the FLOW bit is not set (FLOW bit is cleared). During the time period 64, no Bluetooth data packets are permitted, and because the Bluetooth transceiver has been granted access to the wireless medium and not the WLAN transceiver, the wireless medium is not used at all for any data packets during time period 64, hence the inefficiency noted above.

Figure 3B:
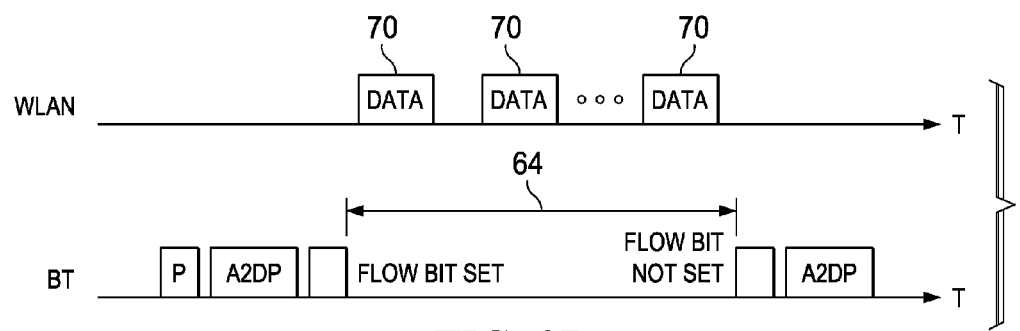
FIG. 3B illustrates an efficient use of the wireless medium among multiple wireless transceivers in accordance with another preferred embodiment of the invention.

In accordance with the preferred embodiments of the invention, FIG. 3B shows a more efficient use of the wireless medium. Because, a Bluetooth packet with set FLOW bit results in the Bluetooth network not being usable during time period 64, the Bluetooth transceiver 12, 14 of wireless device 10 that receives and detects the set FLOW bit alerts the scheduler 16 as to this situation. The scheduler 16 then temporarily grants access to the WLAN transceiver 12, 14 to communicate on the wireless medium during time period 64 as illustrated by data packets 70. Upon detecting receipt of a Bluetooth packet without a set FLOW bit, the scheduler 16 may automatically grant access to the wireless medium back to the Bluetooth transceiver.

The packet with FLOW bit set in this case does not indicate when the FLOW bit will be unset (i.e., the timer period 64 is not encoded in a packet), and thus the length of time period 64 is not known with certainty. However, the length of the time period 64 can be estimated. For example, the length of time period 64 can be predicted based on history information using a moving average of the time periods observed in the past. The transceivers 12, 14 or scheduler 16 measures and records the amount of time between when FLOW bits are set and then unset, computes a running average of such time intervals and uses that computed average to determine how much time to allocate to the temporary use of the wireless medium by the WLAN transceiver.

As with the WLAN-to-Bluetooth deferral, in some embodiments when the scheduler 16 temporarily grants the WLAN transceiver 12, 14 access to the wireless medium during timer period 64, no other wireless device the Bluetooth PAN is informed that the Bluetooth transceiver of wireless device 10 no longer is granted access to the wireless medium.

Figure 4:
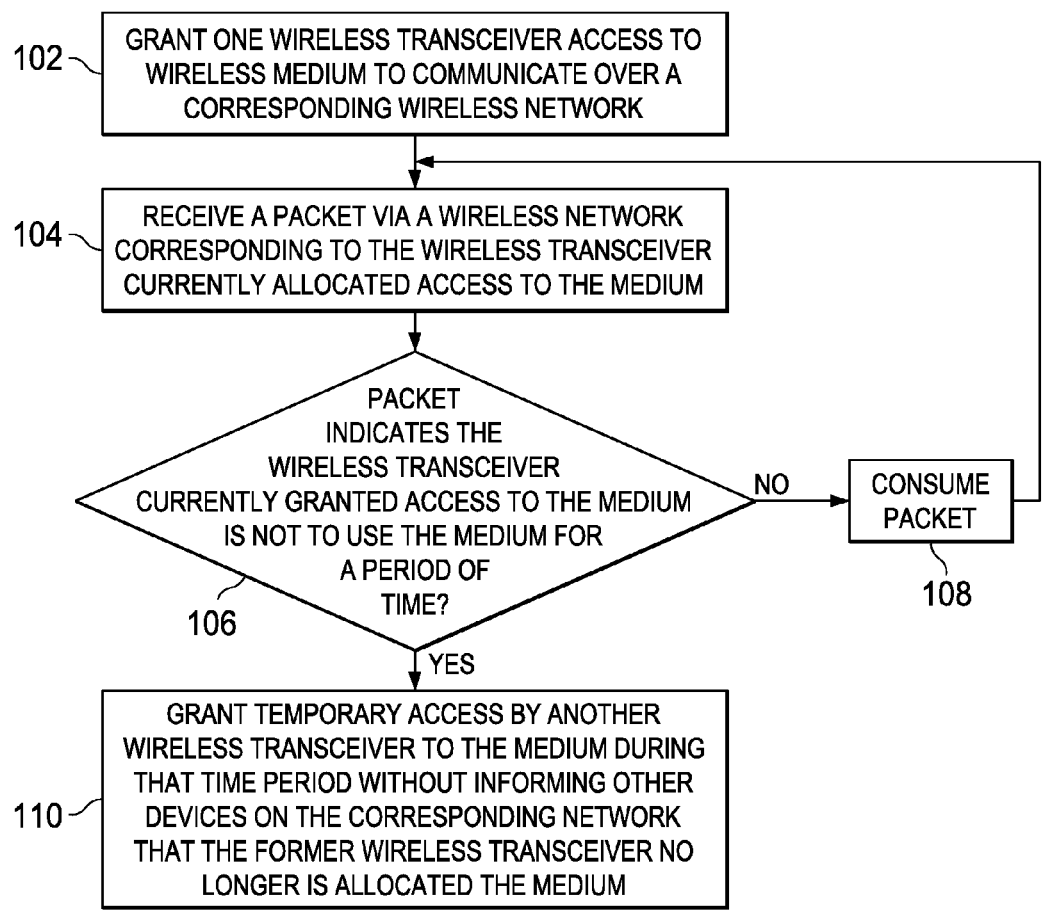
FIG. 4 illustrates a method in accordance with a preferred embodiment of the invention.

FIG. 4 provides an illustrative method in accordance with various embodiments. The actions depicted in FIG. 4 may be performed in the order shown or in a different order. The actions depicted are performed by a wireless device such as wireless device 10 of FIG. 1, and specifically the transceivers 12, 14 and scheduler 16.

At 102, the method comprises granting one of the wireless transceivers access to the wireless medium to communicate with over a corresponding wireless network. For example, the scheduler 16 may grant access to the WLAN transceiver 12, 14 to communicate over its corresponding WLAN, or to the Bluetooth transceiver 12, 14 to communicate over its corresponding Bluetooth PAN. The "corresponding" wireless network thus refers to the network over which the wireless transceiver is configured to communicate.

At 104, the method further comprises receiving a packet via the wireless network corresponding to the granted wireless transceiver. At 106, the wireless device 10 (e.g., the granted transceiver 12, 14 or the scheduler 16) determines whether the received packet provides an indication that the wireless transceiver currently granted access to the wireless medium is not to use the medium for a period of time. Several examples are provided above (e.g., WLAN RTS/CTS/CTS2Self packet, WLAN data packet (TXOP), Bluetooth packet with a set FLOW bit).

If the received packet does not have an indication that the current wireless transceiver is not to use the medium, then the packet is consumed at 108 by the receiving wireless device 10. However, at 110 based on the packet indicating that wireless transceiver is not to use the wireless medium for a period of time, the method includes granting temporary access by another wireless transceiver to the wireless medium to communicate with that transceiver's own corresponding wireless network. Further, no devices on the former wireless network (i.e., the wireless network corresponding to the transceiver that just lost access to the medium) are informed that the former wireless transceiver no longer is granted access to the wireless medium.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless device, comprising:
   a first wireless transceiver configured for communication via a first wireless network;
   a second wireless transceiver configured for communication via a second wireless network; and
   a scheduler that controls which of the first and second transceivers is granted access to a wireless medium at a given time;
   wherein, when the first wireless transceiver has been granted access to the wireless medium by the scheduler and the first wireless transceiver receives a packet via the first wireless network, the scheduler temporarily grants the second wireless transceiver access to the wireless medium based on the packet indicating that first wireless transceiver is not using the wireless medium for a period of time; and
   wherein no other device in the first wireless network is informed that the first wireless transceiver no longer is granted access to the wireless medium.

2. The wireless device of claim 1 wherein the period of time is encoded in the packet.

3. The wireless device of claim 1 wherein the period of time is not encoded in the packet and instead is estimated based on history information.

4. The wireless device of claim 1 wherein the packet is a packet from a group consisting of a wireless local area network (WLAN) RTS/CTS/CTS2Self packet and WLAN data packet.

5. The wireless device of claim 1 wherein the packet is a Bluetooth packet that contains a set FLOW bit, and the period of time begins with receipt of the packet with the set FLOW bit.

6. The wireless device of claim 5 wherein the period of time ends upon receipt of Bluetooth packet that does not contain a set FLOW bit.

7. The wireless device of claim 1 wherein, upon expiration of the period of time, the scheduler grants the first wireless transceiver access to the wireless medium.

8. The wireless device of claim 1 wherein, based on receipt of the packet, the first wireless transceiver notifies the scheduler that the scheduler can grant the second wireless transceiver access to the wireless medium.

9. A method, comprising:
   granting a first wireless transceiver access to a wireless medium to communicate with a first wireless network;
   receiving a packet via the first wireless network; and
   based on the packet indicating that first wireless transceiver is not using the wireless medium for a period of time, granting temporary access by a second wireless transceiver to the wireless medium to communicate with a second wireless network, wherein granting temporary access occurs without informing any other devices on the first wireless network that the first wireless transceiver no longer is granted access to the wireless medium.

10. The method of claim 9 wherein the period of time is encoded in the packet.

11. The method of claim 9 wherein the period of time is not encoded in the packet and the method further comprises estimating the period of time based on history information.

12. The method of claim 9 wherein the packet is a packet from a group consisting of a wireless LAN (WLAN) RTS/CTS/CTS2Self packet and WLAN data packet.

13. The method of claim 9 wherein the packet is a Bluetooth packet that contains a set FLOW bit, and the period of time begins with receipt of the packet with the set FLOW bit.

14. The method of claim 13 wherein the period of time ends upon receipt of Bluetooth packet that does not contain a set FLOW bit.

15. The method of claim 9 wherein, upon expiration of the period of time, again granting the first wireless transceiver access to the wireless medium.

* * * * *